United States Patent
Suzuki (10) Patent No.: US 9,610,828 B2
(45) Date of Patent: Apr. 4, 2017

(54) TRANSMITTED SOUND INSULATING MEMBER, AND TRANSMITTED SOUND INSULATING STRUCTURE INCLUDING THE TRANSMITTED SOUND INSULATING MEMBER

(71) Applicant: TOYOTA JIDOSHA KABUSHIKI KAISHA, Toyota-shi (JP)

(72) Inventor: Yuya Suzuki, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/158,181

(22) Filed: May 18, 2016

(65) Prior Publication Data

US 2016/0355076 A1 Dec. 8, 2016

(30) Foreign Application Priority Data

Jun. 5, 2015 (JP) ................. 2015-115177

(51) Int. Cl.
*B60R 13/08* (2006.01)
*B60J 5/04* (2006.01)

(52) U.S. Cl.
CPC ............. *B60J 5/0418* (2013.01); *B60R 13/08* (2013.01)

(58) Field of Classification Search
CPC .... B60J 5/0418; B60R 13/08; B60R 13/0243; B60R 16/0207

USPC ............................... 296/146.9; 181/287, 295
See application file for complete search history.

(56) References Cited

U.S. PATENT DOCUMENTS 8,123,178 B2 * 2/2012 Yoshida .............. B60R 16/0215
174/72 A

FOREIGN PATENT DOCUMENTS

JP 2013-107607 6/2013
JP 2013-256176 12/2013

* cited by examiner

*Primary Examiner* — Jeremy Luks
(74) *Attorney, Agent, or Firm* — Oblon, McClelland, Maier & Neustadt, L.L.P.

(57) ABSTRACT

A transmitted sound insulating member is for a vehicle including a door in which a wire harness extends through a space defined between a door inner panel and a door trim. The transmitted sound insulating member includes a first sealing portion disposed between the door inner panel and the door trim to close an opening of the space. The first sealing portion includes a first lip having flexibility, and an insertion hole through which the wire harness is inserted. The first lip is provided on one side of the first sealing portion, which is brought into contact with the door trim. The first lip has a slit extending toward the door inner panel. The insertion hole is communicated with the slit of the first lip. The first sealing portion is configured such that a space of the slit is closed when the first lip is pressed against the door trim.

4 Claims, 8 Drawing Sheets

TRANSMITTED SOUND INSULATING MEMBER, AND TRANSMITTED SOUND INSULATING STRUCTURE INCLUDING THE TRANSMITTED SOUND INSULATING MEMBER

INCORPORATION BY REFERENCE

The disclosure of Japanese Patent Application No. 2015-115177 filed on Jun. 5, 2015 including the specification, drawings and abstract is incorporated herein by reference in its entirety.

BACKGROUND OF THE INVENTION

1. Field of the Invention

The invention relates to a transmitted sound insulating member, and a transmitted sound insulating structure including the transmitted sound insulating member. More specifically, the invention relates to a transmitted sound insulating member that blocks a sound from outside a vehicle from entering a vehicle cabin through a door of the vehicle, and a transmitted sound insulating structure including the transmitted sound insulating member.

2. Description of Related Art

Figure 12:
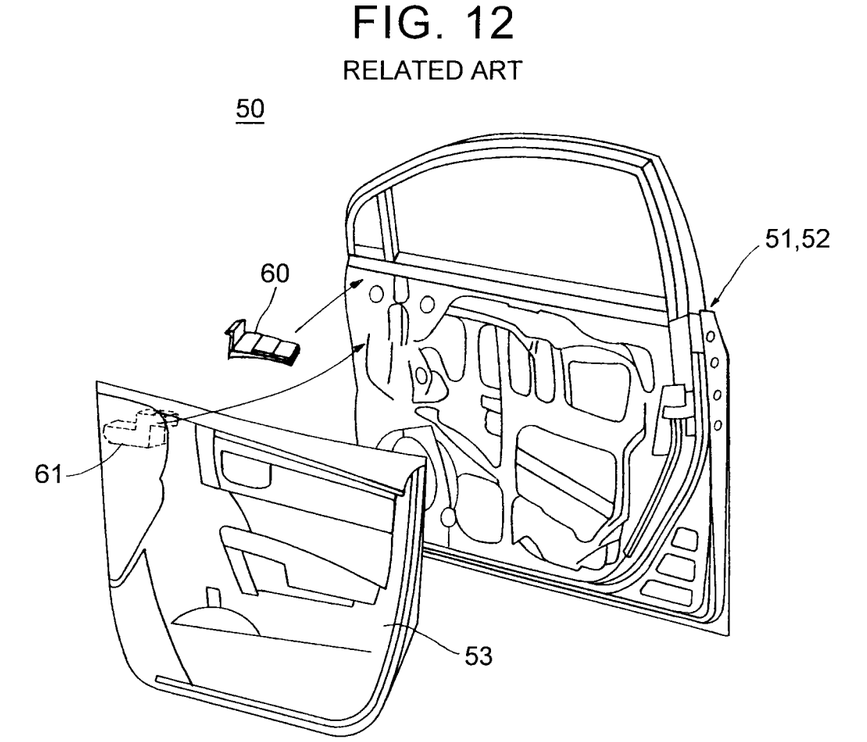
FIG. 12 is an exploded view of a front door according to related art.
Figure 13:
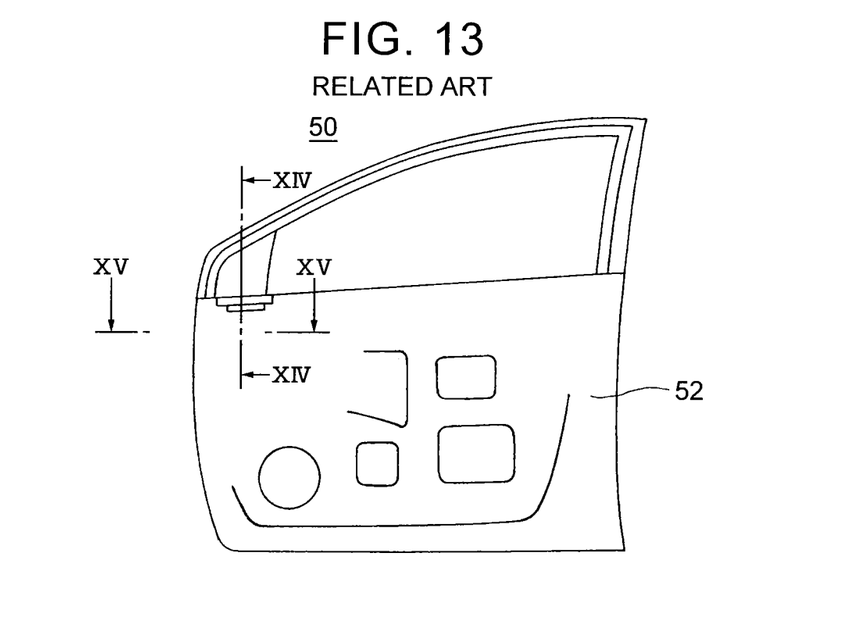
FIG. 13 is an inner side view of the front door according to the related art.
Figure 14:
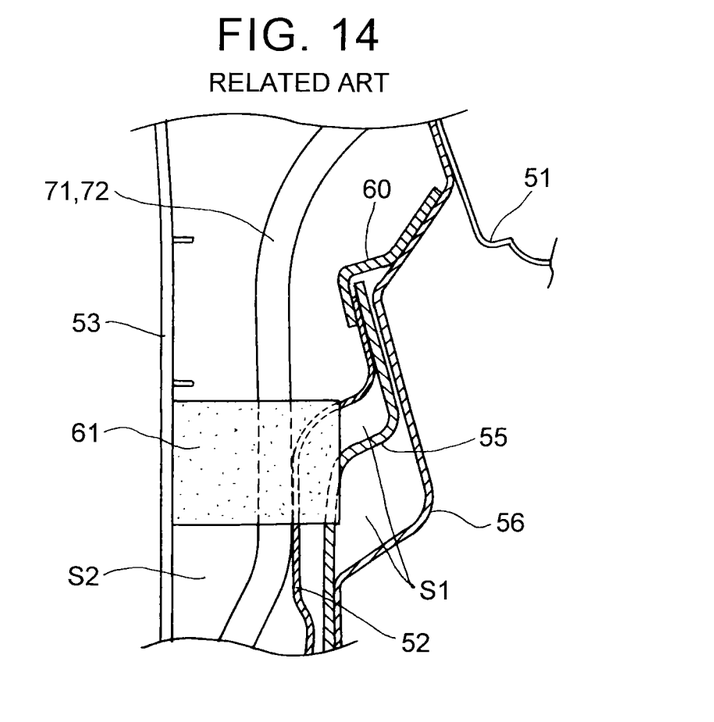
FIG. 14 is a sectional view taken along the line XIV-XIV in FIG. 13.
Figure 15:
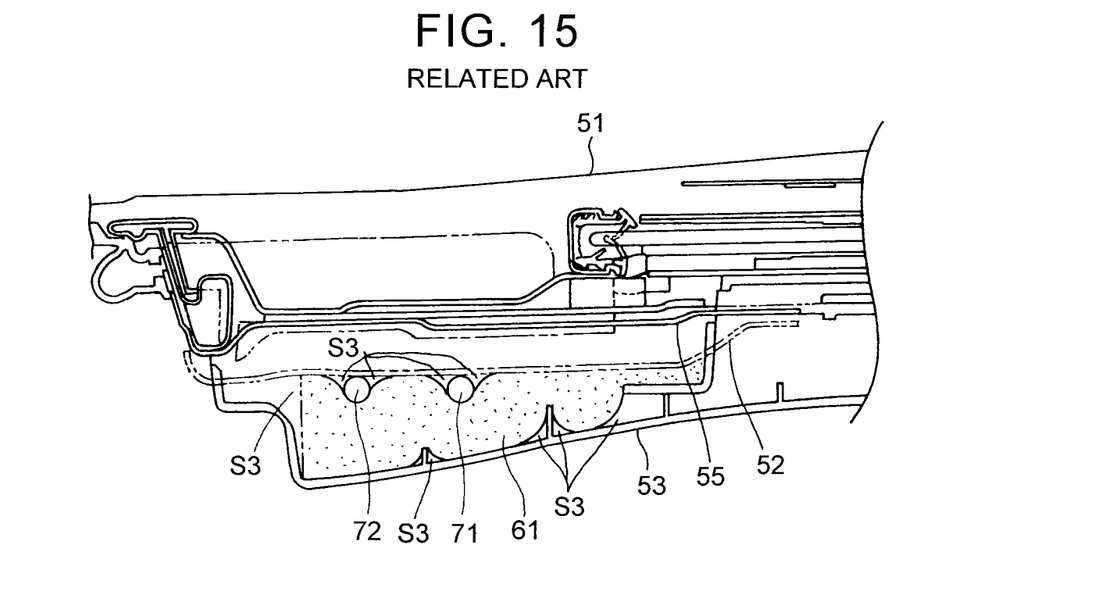
FIG. 15 is a sectional view taken along the line XV-XV in FIG. 13.

There has been a need to block an external sound from entering an automobile cabin through the vicinity of a wing mirror mounting portion of a front door of an automobile. FIG. 12 is an exploded view of a front door according to related art. FIG. 13 is an inner side view of the front door. FIG. 14 is a sectional view of the front door taken along the line XIV-XIV in FIG. 13. FIG. 15 is a sectional view of the front door taken along the line XV-XV in FIG. 13.

As illustrated in FIG. 12, a front door 50 of an automobile is formed by assembling a door outer panel 51 and a door inner panel 52, which are made of steel plates subjected to stamping and joined together, and a door trim 53 to be disposed on the automobile cabin side. As illustrated in FIG. 14, a plurality of plate members 55, 56 and the like are disposed between the door outer panel 51 and the inner panel 52. A sound from outside the automobile travels upward through spaces S1 defined by the upper portions of the inner panel 52 and the plate members 55, 56 and then enters the automobile cabin. Further, there is another route of external sound entry. Specifically, a sound from outside the automobile travels upward through a space S2 defined between the inner panel 52 and the door trim 53 and then enters the automobile cabin.

To block a sound from entering the automobile cabin from the upper end side of the plate members 55, 56 and the inner panel 52, a rubber sealing member 60 is provided to close openings, as illustrated in FIG. 12 (refer to Japanese Unexamined Patent Application Publication No. 2013-107607 (JP 2013-107607 A)). To prevent transmission of a sound traveling through the space S2 defined between the inner panel 52 and the door trim 53, a foamed member 61 having elasticity (e.g. sponge) is provided in the space S2, for example, as illustrated in FIG. 14 (refer to Japanese Unexamined Patent Application Publication No. 2013-256176 (JP 2013-256176 A)).

However, providing only the sealing member 60 illustrated in FIG. 12 and FIG. 14 cannot completely block a sound passing through the space S2 defined between the inner panel 52 and the door trim 53. When the foamed member 61 is provided in the space S2, wire harnesses 71, 72 extending in the up-down direction through the space S2 need to be pressed by the side surface of the foamed member 61, as illustrated in FIG. 14. Thus, there are large spaces S3 between the foamed member 61 and the wire harnesses 71, 72 and between the door trim 53 and the foamed member 61, as illustrated in FIG. 15. This significantly reduces the sound insulating effect.

SUMMARY OF THE INVENTION

The invention provides a transmitted sound insulating member that blocks a sound from outside a vehicle from entering a vehicle cabin through a door of the vehicle, the transmitted sound insulating member being configured to facilitate the assembly, and achieve high sound insulating property. The invention also provides a transmitted sound insulating structure including the transmitted sound insulating member.

A first aspect of the invention relates to a transmitted sound insulating member for a vehicle including a door in which a wire harness extends through a space defined between a door inner panel and a door trim. The transmitted sound insulating member includes a first sealing portion disposed between the door inner panel and the door trim to close an opening of the space. The first sealing portion includes a first lip having flexibility, and an insertion hole through which the wire harness is inserted. The first lip is provided on one side of the first sealing portion. The one side of the first sealing portion is brought into contact with the door trim. The first lip has a slit extending toward the door inner panel. The insertion hole is communicated with the slit of the first lip. The first sealing portion is configured such that a space of the slit is closed when the first lip is pressed against the door trim.

In the first aspect, the first sealing portion may include a second lip having flexibility. The second lip is provided on a periphery of the insertion hole. The second lip is brought into contact with the wire harness.

The transmitted sound insulating member according to the first aspect may further include a second sealing portion. The second sealing portion is integral with the first sealing portion. The second sealing portion is disposed on upper end side portions of the door inner panel and a plurality of plate members joined to the door inner panel. The second sealing portion may be configured to close openings of spaces defined between the door inner panel and the plurality of plate members joined to the door inner panel.

According to the above aspect, the second sealing portion, which blocks sounds passing through the spaces defined between the door inner panel and the plate members, and the first sealing portion, which blocks a sound passing through the space between the door inner panel and the door trim, are formed as a single-piece member. With this configuration, it is possible to reduce the production cost, facilitate the assembly, and achieve high sound insulating property. Further, the first sealing portion has the insertion hole with the lip provided on its periphery. Such a configuration can substantially eliminate a space around the wire harness extending through the space between the door inner panel and the door trim. Further, the wire harness is inserted through the the insertion hole via the slit. Upon the mounting of the door trim, the lip of the first sealing portion is pressed against the door trim, so that the slit is deformed and thus closed.

A second aspect of the invention relates to a transmitted sound insulating structure including the transmitted sound insulating member according to the first aspect, a door outer panel, a door inner panel joined to the door outer panel, and a door trim disposed between a vehicle cabin and the door inner panel. The transmitted sound insulating structure is configured such that the transmitted sound insulating member is disposed between the door inner panel and the door trim. In this transmitted sound insulating structure, the advantageous effect of the transmitted sound insulating member is achieved.

The above aspect of the invention provides the transmitted sound insulating member that blocks a sound from outside a vehicle from entering a vehicle cabin through a door of the vehicle, the transmitted sound insulating member being configured to facilitate the assembly, and achieve high sound insulating property.

BRIEF DESCRIPTION OF THE DRAWINGS

Features, advantages, and technical and industrial significance of exemplary embodiments of the invention will be described below as illustrated in the accompanying drawings, in which like numerals denote like elements, and wherein.

DETAILED DESCRIPTION OF EMBODIMENTS

Hereinafter, a transmitted sound insulating member and a transmitted sound insulating structure including the transmitted sound insulating member according to the embodiment of the invention will be described with reference to the accompanying drawings.

Figure 1:
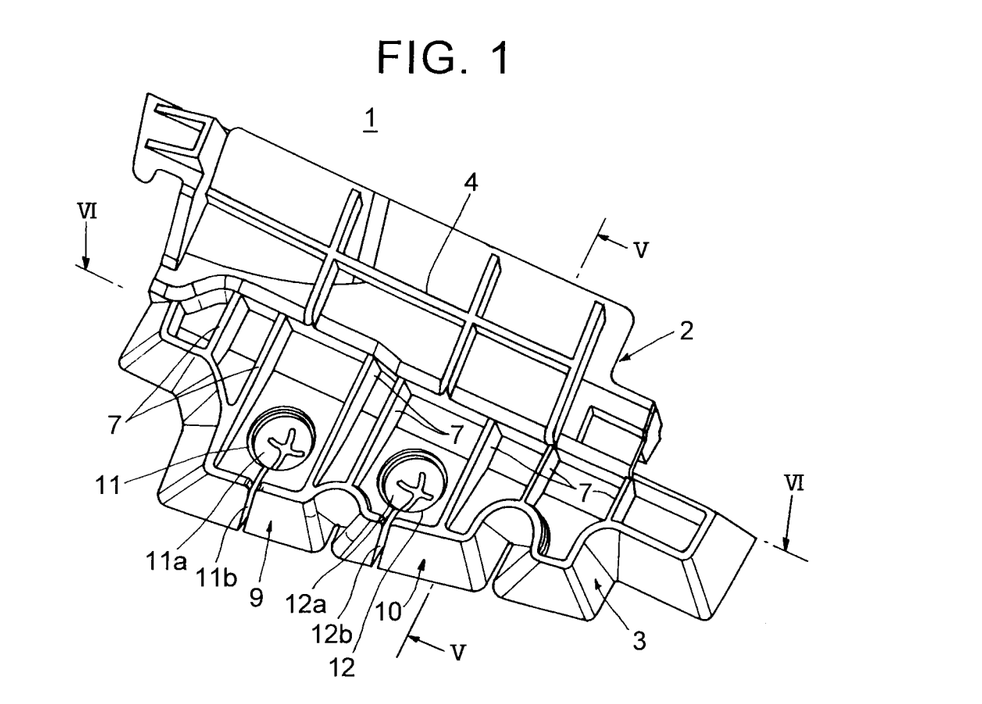
FIG. 1 is a perspective view of an upper portion of a transmitted sound insulating member according to an embodiment of the invention.
Figure 2:
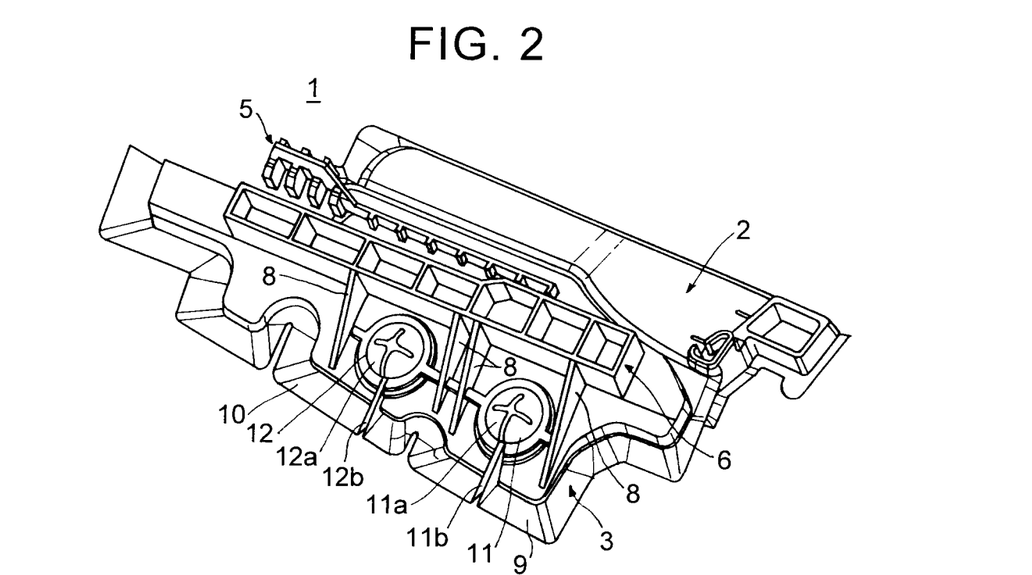
FIG. 2 is a perspective view of a lower portion of the transmitted sound insulating member in FIG. 1.
Figure 3:
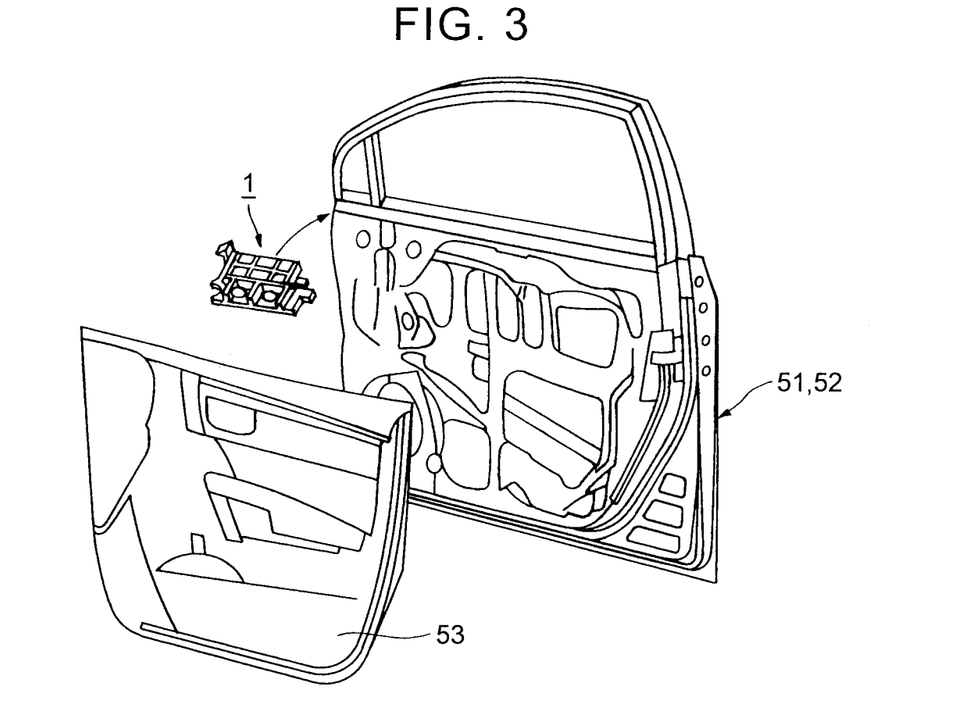
FIG. 3 is an exploded view of a front door of a vehicle, illustrating a mounting position of the transmitted sound insulating member in FIG. 1.
Figure 4:
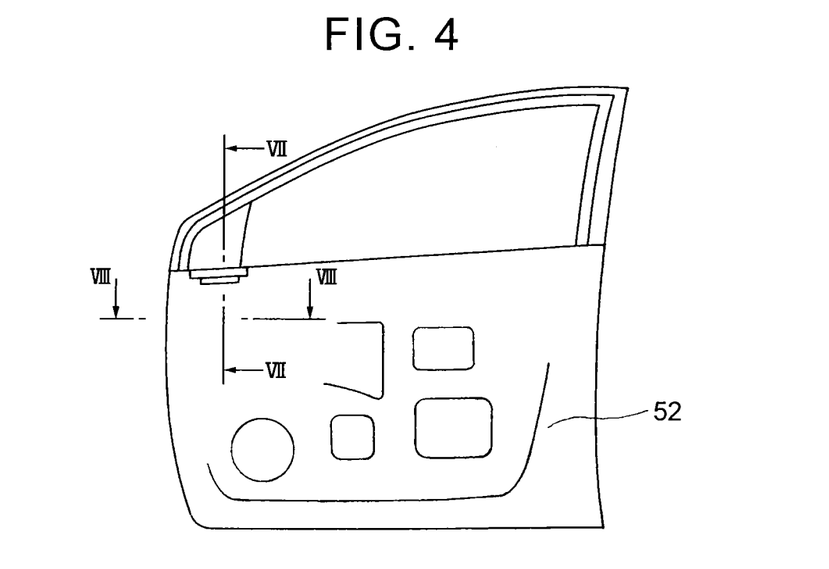
FIG. 4 is a side view of the front door, illustrating the mounting position.

A transmitted sound insulating member 1 illustrated in FIG. 1 is mounted between a door outer panel 51 and a door inner panel 52 joined together, and a door trim 53 disposed on the door inner panel 52 side, as illustrated in FIG. 3. FIG. 4 is a side view of the front door illustrating the mounting position of the transmitted sound insulating member. With this configuration, a transmitted sound insulating structure that produces high sound insulating effect is provided. The transmitted sound insulating member 1 illustrated in FIG. 1 and FIG. 2 is a single-piece member made of a material having flexibility and elasticity, such as a rubber material. The transmitted sound insulating member 1 includes a second sealing portion 2 to be disposed on the upper end of the door inner panel 52 and a first sealing portion 3 to be disposed between the door inner panel 52 and the door trim 53.

As illustrated in in FIG. 1, a reinforcing rib 4 is provided on the upper surface of the second sealing portion 2. As illustrated in in FIG. 2, a corrugated engaging rib 5 and a box engaging rib 6 are provided on the lower surface of the transmitted sound insulating member 1. The corrugated engaging rib 5 is provided with a plurality of corrugations to be engaged with an upper end side portion of the door inner panel 52. The internal space of the box engaging rib 6 is partitioned into a plurality of spaces.

Figure 7:
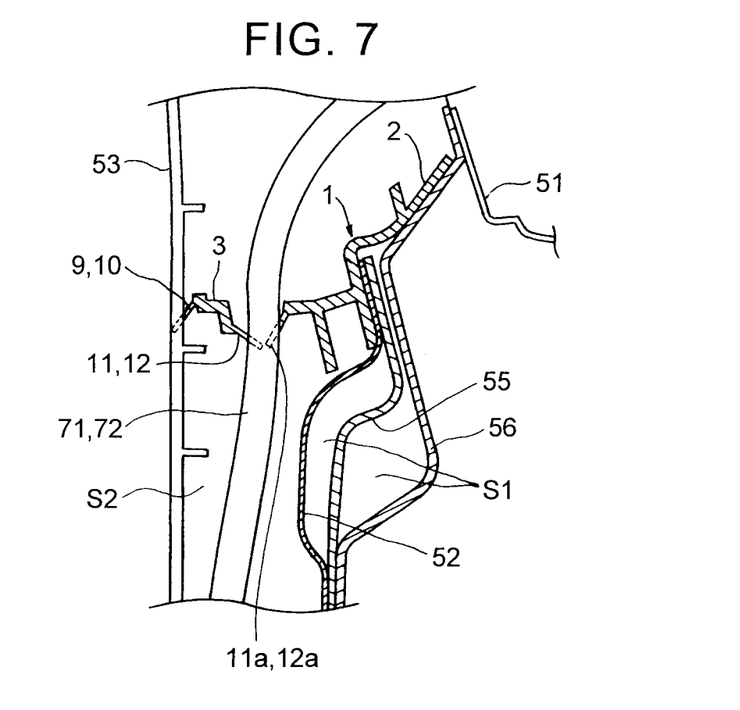
FIG. 7 is a sectional view taken along the line VII-VII in FIG. 4.
Figure 8:
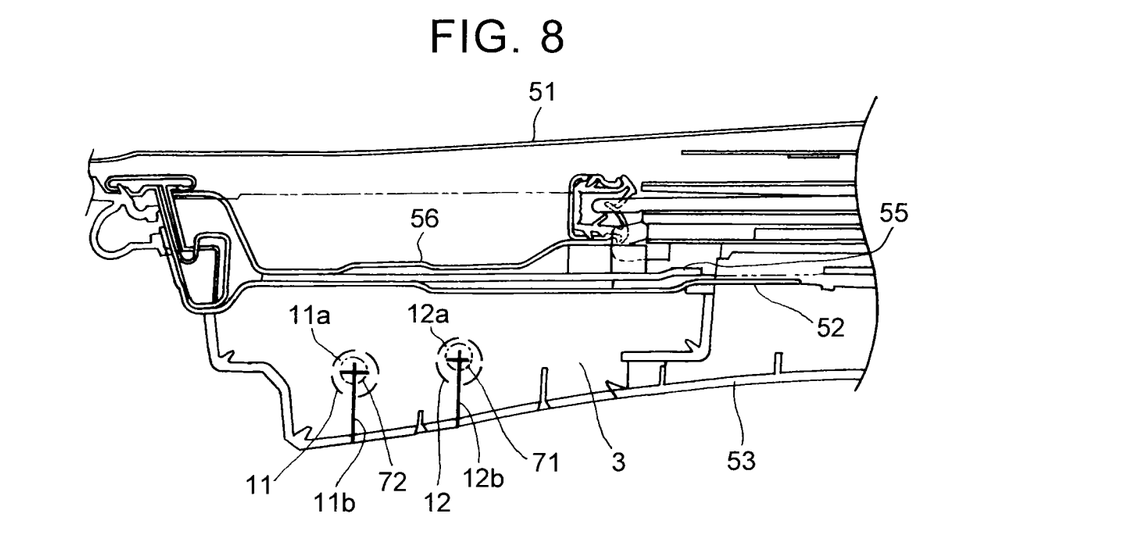
FIG. 8 is a sectional view taken along the line VIII-VIII in FIG. 4.

Further, as illustrated in FIG. 1 and FIG. 2, reinforcing ribs 7 are provided on the upper surface of the first sealing portion 3, and reinforcing ribs 8 are provided on the lower surface of the first sealing portion 3. The first sealing portion 3 has insertion holes that are equal in number to wire harnesses to be extended into the front door. In the present embodiment, the first sealing portion 3 has two insertion holes 11, 12 that pass through the first sealing portion 3 in the up-down direction, as illustrated in FIG. 8. As illustrated in FIG. 7, lips 11a, 12a (second lips) are provided on the peripheries of the insertion holes 11, 12, respectively. More specifically, the lips 11a, 12a are provided on inner peripheral surfaces of the first sealing portion 3, the inner peripheral surfaces defining the insertion holes 11, 12, respectively. When the wire harnesses 71, 72 are inserted through the insertion holes 11, 12, the lips 11a, 12a come into contact with the outer peripheries of the wire harnesses 71, 72, respectively. As a result, substantially no space is left between the lips 11a, 12a, and the wire harnesses 71, 72.

As illustrated in FIG. 1, the lips 11a, 12a each have a downwardly concave shape. After the insertion of the wire harnesses 71, 72, the state where all the lip pieces are oriented downward is maintained. Each of the lips 11a, 12a is formed by, for example, providing a cross-shaped slit in a rubber plate having a domical concave surface. Providing the lips 11a, 12a on the peripheries of the insertion holes 11, 12 makes it possible to absorb variations in diameters of the wire harnesses 71, 72.

Lips 9, 10 (first lips) protruding obliquely downward is formed on one side of the first sealing portion 3. The lips 9, 10 have slits 11b, 12b leading to the insertion holes 11, 12, respectively. The slits 11b, 12b facilitate the insertion of the wire harnesses 71, 72 into the insertion holes 11, 12, respectively.

Figure 5:
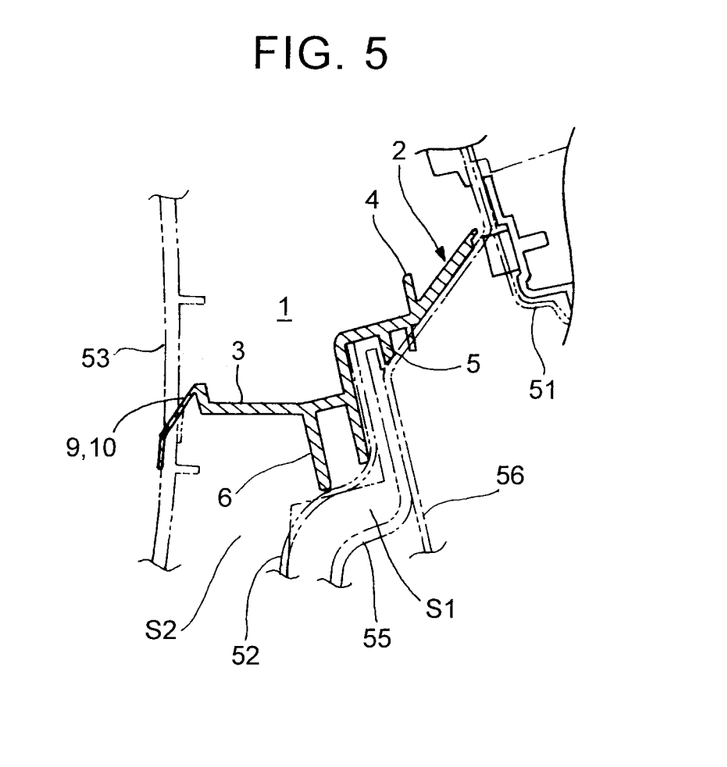
FIG. 5 is a sectional view taken along the line V-V in FIG. 1, in the state where the transmitted sound insulating member is mounted in the front door.
Figure 6:
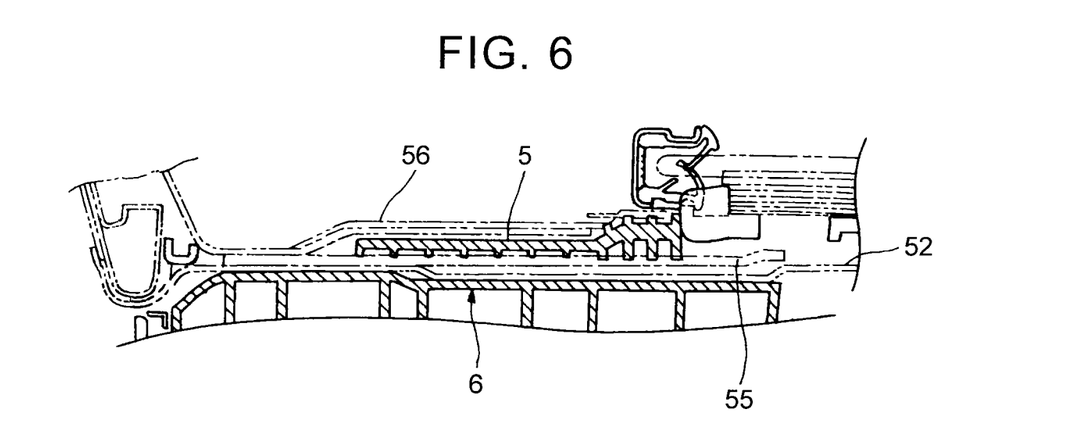
FIG. 6 is a sectional view taken along the line VI-VI in FIG. 1.

To mount the transmitted sound insulating member 1, as illustrated in FIG. 5 and FIG. 6, the upper end side portions of the door inner panel 52 and the plate members 55, 56 are inserted between the corrugated engaging rib 5 and the box engaging rib 6. Further, as illustrated in FIG. 5, a side surface of the box engaging rib 6 and a side surface of the door inner panel 52 are brought into close contact with each other, and a side (rear) surface of the second sealing portion 2 and a side (upper) surface of the plate member 56 are brought into close contact with each other. In this way, upper openings of the spaces S1 defined by the door inner panel 52 and the plate members 55, 56 are closed and thus sealed. As illustrated in FIG. 5 and FIG. 7, the lips 9, 10 provided on the side end of the first sealing portion 3 are pressed against a side wall of the door trim 53. In this way, an opening of the space S2 defined between the door trim 53 and the door inner panel 52 is sealed.

Figure 9:
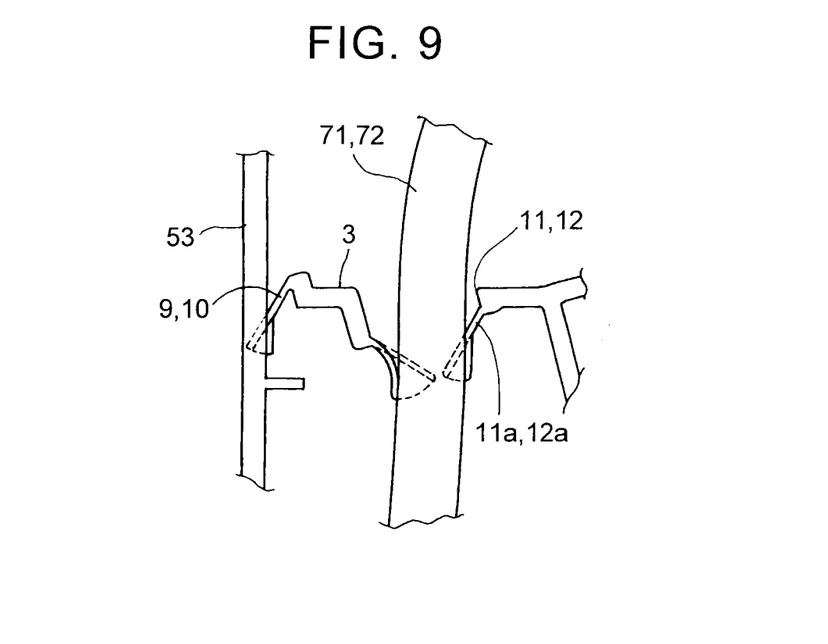
FIG. 9 is an enlarged partial sectional view of the transmitted sound insulating member.

The wire harnesses 71, 72 extend in the up-down direction through the space S2 between the door trim 53 and the door inner panel 52, and therefore the first sealing portion 3 has the insertion holes 11, 12 through which the wire harnesses 71, 72 are inserted, as described above. As illustrated in FIG. 9, the lips 11a, 12a are respectively brought into close contact with the outer peripheries of the wire harnesses 71, 72 inserted through the insertion holes 11, 12, with substantially no space left therebetween.

Figure 10A:
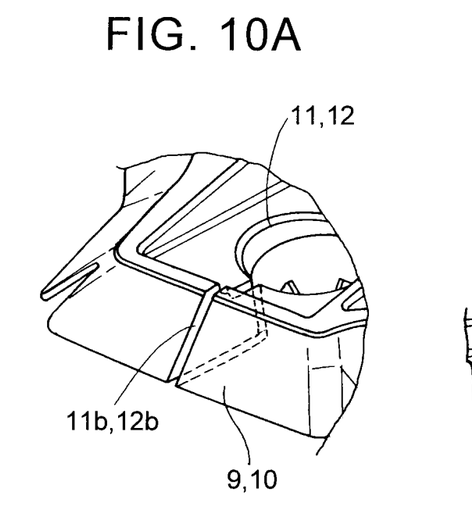
FIG. 10A is an enlarged partial perspective view of the transmitted sound insulating member.
Figure 10B:
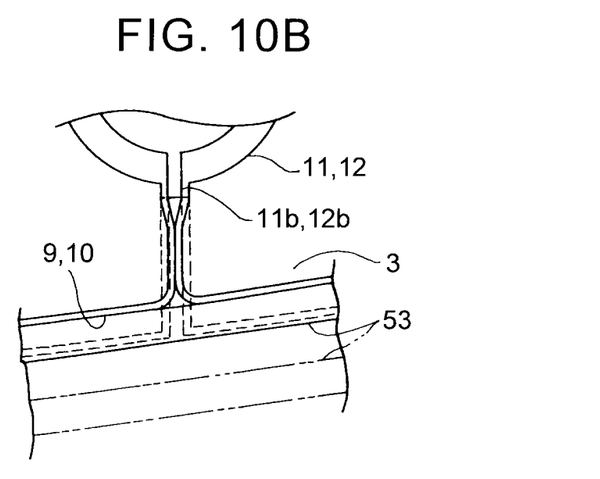
FIG. 10B is an enlarged partial perspective view of the transmitted sound insulating member.
Figure 11:
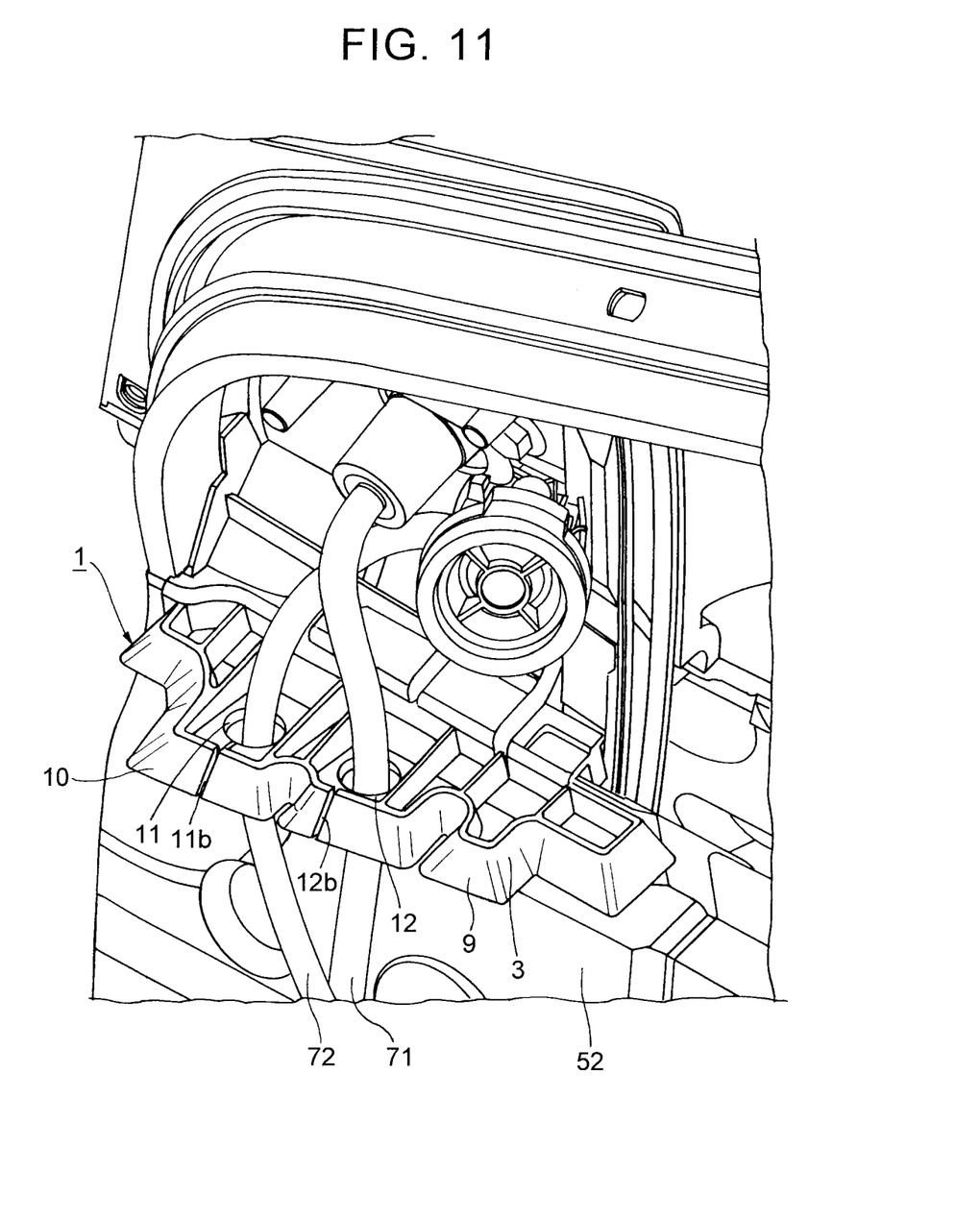
FIG. 11 is a perspective view illustrating the state where the transmitted sound insulating member is mounted on a door inner panel.

As described above, the wire harnesses 71, 72 are inserted through the insertion holes 11, 12 via the slits 11b, 12b, respectively (refer to FIG. 10A). As a result, the state illustrated in FIG. 11 is achieved. A side surface of the door trim 53 is then pressed against the lips 9, 10 provided on the side end of the first sealing portion 3, so that the lips 9, 10 are deformed downward and the side surfaces defining the slits 11b, 12b expand and come into contact with each other with substantially no space left therebetween, as illustrated in FIG. 10B.

According to the embodiment described above, the second sealing portion 2, which blocks sounds passing through the spaces S1 defined by the door inner panel 52 and the plate members 55, 56, and the first sealing portion 3, which blocks a sound passing through the space S2 between the door inner panel 52 and the door trim 53, are formed as a single-piece member. With this configuration, it is possible to reduce the production cost, facilitate the assembly, and achieve high sound insulating property. Further, the first sealing portion 3 has the insertion holes 11, 12 with the lips 11a, 12a provided on their peripheries, respectively, as described above. Such a configuration can substantially eliminate spaces around the wire harnesses 71, 72 extending through the space S2 between the door inner panel 52 and the door trim 53. Further, the wire harnesses 71, 72 are inserted through the insertion holes 11, 12 via the slits 11b, 12b leading to the insertion holes 11, 12, respectively. Upon the mounting of the door trim 53, the lips 9, 10 of the first sealing portion 3 are pressed against the door trim 53, so that the slits 11b, 12b are deformed and thus closed.

In the above-described embodiment, the number of the wire harnesses 71, 72 is two. However, the number of the wire harnesses is not limited to any particular number. The first sealing portion 3 needs to be provided with insertion holes that are equal in number to the wire harnesses and that have the same configuration as that of the insertion holes 11, 12.

In the above-described embodiments, the transmitted sound insulating member 1 is a single-piece component independently produced. However, a transmitted sound insulating member may have any other configuration. For example, a transmitted sound insulating member may be formed so as to be integral with another component. For example, the transmitted sound insulating member 1 and the door trim 53 may be made of resin and formed as a single-piece member. In this case, the lips 9, 10 provided on the side end of the first sealing portion 3 are formed so as to be apart from the door trim 53 before the mounting of the door trim 53, such that the wire harnesses 71, 72 can be inserted through the insertion holes 11, 12 via the slits 11b, 12b.

What is claimed is:

1. A transmitted sound insulating member for a vehicle including a door in which a wire harness extends through a space defined between a door inner panel and a door trim, the transmitted sound insulating member comprising
   a first sealing portion disposed between the door inner panel and the door trim to close an opening of the space, wherein
   the first sealing portion includes: a first lip having flexibility, the first lip provided on one side of the first sealing portion, the one side being brought into contact with the door trim, and the first lip having a slit extending toward the door inner panel; and an insertion hole through which the wire harness is inserted, and the insertion hole being communicated with the slit of the first lip, and
   the first sealing portion is configured such that a space of the slit is closed when the first lip is pressed against the door trim.

2. The transmitted sound insulating member according to claim 1, wherein the first sealing portion includes a second lip having flexibility, the second lip being provided on a periphery of the insertion hole, and the second lip being brought into contact with the wire harness.

3. The transmitted sound insulating member according to claim 1, the transmitted sound insulating member further comprising a second sealing portion that is integral with the first sealing portion, the second sealing portion being disposed on upper end side portions of the door inner panel and a plurality of plate members joined to the door inner panel,
   wherein the second sealing portion is configured to close openings of spaces defined between the door inner panel and the plurality of plate members joined to the door inner panel.

4. A transmitted sound insulating structure comprising:
   the transmitted sound insulating member according to claim 1;
   a door outer panel;
   a door inner panel joined to the door outer panel; and
   a door trim disposed between a vehicle cabin and the door inner panel,
   wherein the transmitted sound insulating structure is configured such that the transmitted sound insulating member is disposed between the door inner panel and the door trim.

* * * * *